United States Patent [19]
Mansmann et al.

[11] 3,982,955
[45] Sept. 28, 1976

[54] ALUMINUM OXIDE FIBERS AND THEIR PRODUCTION

[75] Inventors: Manfred Mansmann; Ludwig Schmidt, both of Krefeld, Germany

[73] Assignee: Bayer Aktiengesellschaft, Leverkusen, Germany

[22] Filed: Oct. 21, 1974

[21] Appl. No.: 516,831

Related U.S. Application Data

[62] Division of Ser. No. 316,311, Dec. 18, 1972, Pat. No. 3,865,599.

[30] Foreign Application Priority Data

Dec. 22, 1971 Germany............................ 2163678

[52] U.S. Cl. ........................... 106/307; 106/288 B; 106/65; 106/56; 106/73.4; 106/73.5
[51] Int. Cl.² ......................................... C01B 33/26
[58] Field of Search ................. 106/307, 288 B, 65, 106/56, 73.4, 73.5; 264/63, 65, 211

[56] References Cited
UNITED STATES PATENTS

| | | | |
|---|---|---|---|
| 3,607,025 | 9/1971 | Jacobson | 106/65 |
| 3,753,744 | 8/1973 | Komaru et al. | 106/56 |

Primary Examiner—Winston A. Douglas
Assistant Examiner—J. V. Howard
Attorney, Agent, or Firm—Burgess, Dinklage & Sprung

[57] ABSTRACT

Aluminum oxide fibers of the approximate percent composition by weight:

| | |
|---|---|
| $Al_2O_3$ | 61–98% preferably 76–96% |
| $SiO_2$ | 1–20% preferably 3–15% |
| $P_2O_5$ | 0–10% preferably 0–5% |
| $B_2O_3$ | 0–10% preferably 0–5% |
| MgO | 0–5% preferably 0–1% |
| C | 0.1–4% preferably 0.5–2.8% |

The fibers are produced by dry spinning a solution containing a neutral or basic aluminum salt of a monobasic lower carboxylic acid, a hydrolyzed silicic acid ester or organoalkoxysilane and polyethylene oxide having a degree of polymerization of at least about 2,000. The product is then heat treated at a temperature between about 400° and 1,800°C. Phosphorus, boron and magnesium may also be present in the solution and end up in the fiber as oxides.

6 Claims, No Drawings

ALUMINUM OXIDE FIBERS AND THEIR PRODUCTION

This is a division of application Ser. No. 316,311, filed Dec. 18, 1972, now U.S. Pat. No. 3,865,599.

The present invention relates to novel aluminum oxide fibers and their production.

Since $\alpha$-$Al_2O_3$ has the highest E-modulus (Young's modulus) of the aluminum oxide phases, the value being 42,000 kp/mm$^2$, numerous attempts have been made to manufacture $\alpha$-$Al_2O_3$ in the form of continuous fibers. Hitherto, however, all attempts to achieve good mechanical properties have failed since $\alpha$-$Al_2O_3$ is only produced in the course of a heat treatment via several intermediate phases, in the course of which the fibers are greatly weakened. Attempts have already been made, through incorporation of foreign cations, to obtain phases which do not undergo any structural change even at high temperatures, but nevertheless at the same time still contain as high a proportion of $Al_2O_3$ as possible. According to U.S. Pat. No. 3,271,173 attempts have been made to achieve this aim by incorporating lithium to form $Li_2O.5\ Al_2O_3$, a phase which does not undergo any change in modification. While the mechanical properties are distinctly better than those of pure $\alpha$-$Al_2O_3$ fibers, they are still too low for the material to be used as a reinforcing fiber (H. W. Rauch, Sr. W. H. Sutton, L. R. McCreight, "Ceramic Fibers and Fibrous Composite Materials", 1968, page 187).

U.S. Pat. No. 3,503,765 describes a process for the manufacture of polycrystalline fibers based on $Al_2O_3$—$SiO_2$. These fibers mainly consist of mullite (2 $SiO_2$.3 $Al_2O_3$) of crystallite size between 25 and 500, preferably 50 – 100 A, and contain, as integral constituents, 1 to 10% of $B_2O_3$, $P_2O_5$ and/or $TiO_2$. To manufacture them, a solution of metallic Al in aluminum chloride is mixed with a liquid of low surface tension and subsequently with colloidal $SiO_2$ or silicic acid and with smaller amounts of boron oxide, phosphorus pentoxide and/or titanium dioxide and the mixture is evaporated to a viscosity suitable for the manufacture of fibers and is subsequently spun. The fibers containing anions are dried and converted into the corresponding oxide fibers by calcination at a high temperature. The achievable E-moduli according to the examples lie in the range of 4,200 to 21,000 kp/mm$^2$ and are hence substantially lower than the value for the pure $\alpha$-$Al_2O_3$ phase.

A disadvantage in the manufacture of the fibers is the low stability of the spinning solutions which, unless special measures are taken, only remain spinnable for a few hours since their viscosity rapidly increases as a result of polymerization. Although polymerization cannot be entirely avoided it can be noticeably reduced by the addition of acetic acid. As the concentration of the solution increases, its stability declines. Hence this method is also less suitable for the manufacture of continuous fibers, since to produce these fibers the spinning solution must be even more concentrated than for the manufacture of short fibers.

Because of their high viscosity, the concentrated solutions can only be filtered with great difficulty. However, filtration before spinning cannot be dispensed with without adversely influencing the strength of the fibers through unavoidably introduced foreign constituents or extremely fine particles of solids formed in the solution itself.

Fibers of $Al_2O_3$ transition phases, for example the known $\gamma$-$Al_2O_3$ phase, have hitherto not been considered since their existence range is only relatively small (compare, on this matter, J. W. Newsome, H. W. Heiser, A. S. Russelt, H. C. Stumpf, "Alumina Properties", Technical Paper No. 10 AlCOA (1960), page 46). Furthermore, these transition phases are only known as micro-porous substances of large surface area since, within their existence range, the temperature does not suffice to obtain dense products through sintering. As has been known for a long time, micro-pores have an extremely adverse effect on the mechanical properties of fibers.

According to the German Offenlegungsschrift No. 2,054,573, $\gamma$-$Al_2O_3$ fibers having very good mechanical properties can be obtained by separating out 10 – 15% of very finely divided carbon in the fibers during the heat treatment of the gel fibers. Through this measure it has proved possible to stabilize the $\gamma$-$Al_2O_3$ phase up to above 1,100°C, so to activate the sintering that the fibers show no porosity whatsoever, and to prevent crystallite growth, which would contribute to a weakening of the fibers. Only on heating to temperature above about 1,200°C $\gamma$-$Al_2O_3$ is formed.

A process for the manufacture of aluminum oxide fibers containing a proportion of silicon dioxide and, optionally, small amounts of modifying additives, by spinning a solution of the fiber-forming systems and minor amounts of a dissolved linear polymeric high molecular substance, and subsequent heat treatment, has now been found, which is characterized in that the solution containing a neutral or basic aluminum salt of a monobasic lower carboxylic acid and a hydrolyzed silicic acid ester or a hydrolyzed organoalkoxysilane is spun to fibers in the presence of dissolved polyethylene oxide having a degree of polymerization of above about 2,000, and the fibers are subsequently subjected to a heat treatment up to a maximum of about 1,800°C.

The process according to the invention avoids the disadvantages in previously known processes and in particular it is possible thereby to obtain, from relatively dilute and therefore stable, easily filtrable and very simply degassed solutions, continuous fibers which display a high tensile strength and a high E-modulus and are oustandingly suitable for reinforcing plastics, glasses, ceramic materials and metals.

The invention further relates to new, industrially valuable aluminum oxide fibers having good mechanical properties, which are characterized by the following approximate composition by weight:

| | |
|---|---|
| $Al_2O_3$ | 61–98% preferably 76–96% |
| $SiO_2$ | 1–20% preferably 3–15% |
| $P_2O_5$ and/or $B_2O_3$ | 0–10% preferably 0–5% |
| MgO | 0–5% preferably 0–1% |
| C | 0.1–4% preferably 0.5–2.8% |

Fibers of the abovementioned composition are obtained by a heat treatment of the fibers obtained in the gel state at temperatures of approximately 400° to 1,800°C.

Within the indicated analytical composition, the fibers can, depending on their heat treatment, be characterized by their phase content, which can be determined by X-ray methods; it is possible to differentiate 4 types:

1. Aluminum oxide fibers which are amorphous to X-rays; they are formed by a heat treatment at between about 400°C and about 950°C. Their density is about 2.8 – 3.0 g/cm$^3$. Typical values of their tensile strength lie between about 80 and 180 kp/mm$^2$ and typical values of their E-modulus between about 9,000 and 14,000 kp/mm$^2$.

2. Polycrystalline $\gamma$-Al$_2$O$_3$ fibers; they are produced by a heat treatment at between about 950°C and 1,150°C. Their SiO$_2$ content is not detectable in the X-ray diagram. Their density is about 2.9 – 3.4 g/cm$^3$. Typical values for their tensile strength lie between about 100 and 270 kp/mm$^2$ and for their E-modulus between about 20,000 and 24,000 kp/mm$^2$. The crystallite size of the $\gamma$-Al$_2$O$_3$ phase is about 40 – 70 A.

3. Polycrystalline $\gamma$-Al$_2$O$_3$/mullite fibers; they are produced by a heat treatment at between about 1,200 and 1,400°C. Their density is between about 3.1 and 3.6 g/cm$^3$. Their strength data corresponds to those of the $\gamma$-Al$_2$O$_3$ fibers; their E-modulii are between about 21,000 and 26,000 kp/mm$^2$. The crystallite size of the $\gamma$-Al$_2$O$_3$ is about 40 – 60 A and that of the mullite phase about 700 – 1,400 A. $\gamma$-Al$_2$O$_3$ is detectable in the X-ray diagram.

4. Polycrystalline $\gamma$-Al$_2$O$_3$/mullite fibers; they are produced by briefly rapidly heating to other types to above about 1,400°C. They have a density of about 3.4 – 3.9 g/cm$^3$ depending on the SiO$_2$ content. The tensile strength and E-modulus are between about 80 and 170, and between about 23,000 and 32,000 kp/mm$^2$ respectively. The crystallite sizes of the $\gamma$-Al$_2$O$_3$ phase and of the mullite phase are between about 500 and 1,100 A.

In the abovementioned German Offenlegungsschrift the sintering behavior and the heat stability of the $\gamma$-Al$_2$O$_3$ fibers are very favorably influenced by the presence of 10 – 15% of carbon. Surprisingly, it has now been found that it is possible to replace most of the carbon by SiO$_2$, whereby fibers of greater stiffness and improved oxidation resistance result. The spinning solutions used for this purpose, which in addition to a neutral or basic aluminum formate, aluminum acetate or aluminum propionate also contain a hydrolyzed silicic acid ester or organoalkoxysilane and a small amount of high molecular polyethylene oxide, are stable and of low viscosity, and possess excellent spinnability.

If attempts are made to add the SiO$_2$ constituent in the form of customary silicic acid or silicic acid sols, stable spinning solutions are not obtained and/or spontaneous precipitations occur. Such solutions are not suitable for the manufacture of fibers of high tensile strength. Surprisingly, spinning solutions containing, for example, aluminum oxychloride as the aluminum component, also do not show high values of the tensile strength and E-modulus. This shows that in the manufacture of the aluminum oxide fibers it is necessary, in order to achieve good mechanical properties, to fulfill a series of conditions which cannot be deduced from the previously published data.

The manufacturing process according to the invention requires little technical effort, so that the fibers are inexpensive and apart from being usable as a reinforcing material can also be employed as high temperature insulation, as filters for hot and/or corrosive gases and liquids and as a catalyst or catalyst support.

In detail, the following procedure can be employed to manufacture the fibers according to the invention: firstly, an aluminum salt solution is produced by dissolving aluminum or aluminum hydroxide in a monobasic lower carboxylic acid such as, for example, formic acid, acetic acid or propionic acid, preferably formic acid, at temperatures of between about 40 and 100°C, employing, in general, about 1.7 – 3.2 moles of the organic acid per 1 mole of Al, so that either basic or neutral salts are present in the solution. It is, however, also possible, without difficulty, to employ commercially available aluminum formates or aluminum acetates as the starting material.

In cases in which aluminum is used in the form of the metal, it is desirable to form an amalgam with a mercury salt solution since without this the reaction takes place significantly more slowly. The amalgam can be formed, for example, by dipping the metal for a short time into an aqueous solution of HgCl$_2$ and subsequently introducing it into the acid. It is however also possible to add the mercury salt conjointly with the metal to the acid solution. In both cases the mercury employed is recovered in the metallic form after the dissolving process.

The amount of water used during dissolving can be so chosen as to give directly a suitable concentration of Al$_2$O$_3$ for the subsequent spinning process. It is however preferred to prepare a substantially more dilute solution, for example with a concentration of about 6 to 9 % of Al$_2$O$_3$, and only to concentrate it to the desired concentration after adding the SiO$_2$ component. The concentration of Al$_2$O$_3$ in the spinning solution is usually between about 8 and 18%, preferably between about 11 to 15%.

The SiO$_2$ constituent of the aluminum oxide fibers according to the invention is present in the spinning solution in the form of a hydrolyzed silicic acid ester or of a hydrolyzed organoalkoxysilane. The hydrolysis of the silicic acid esters, which are the preferred SiO$_2$ source, takes place in accordance with the equation

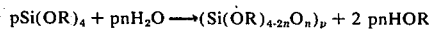

$$pSi(OR)_4 + pnH_2O \longrightarrow (Si(OR)_{4-2n}O_n)_p + 2pnHOR$$

$p$ = degree of condensation
$n$ = 0 to 2 via the intermediate stages of the alkoxypolysiloxanes, up to SiO$_2$, which remains in colloidal solution. The degree of the hydrolysis, like the degree of crosslinking, depends on the amount of available water. As is shown by the equation, at least two moles of water are required per mole of silane for the complete hydrolysis of a tetraalkoxysilane. Instead of tetraalkoxysilanes, alkoxypolysiloxanes can also be used.

Methoxy, ethoxy, propoxy and butoxy groups, individually or as mixtures, are used as alkoxy groups. Methoxy and ethoxy compounds are preferred, that is to say, for example, tetramethoxysilane, tetraethoxysilane, hexamethoxydisiloxane, hexaethoxydisiloxane, octamethoxytrisiloxane, octaethoxytrisiloxane and the like, up to polymethoxy- and polyethoxy-polysiloxane.

The organoalkoxysilanes are characterized by the general formula

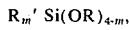

$R_m' Si(OR)_{4-m}$,
$m = 1 - 3$,
wherein
R' is a lower aliphatic hydrocarbon radical such as, for example, a methyl, ethyl, vinyl or allyl group and
OR is the abovementioned alkoxy groupings.

Methyl and methoxy and ethoxy groups are preferred, that is to say, for example, the compounds methyltrimethoxysilane or methyltriethoxysilane.

The hydrolysis of these compounds is generally accelerated catalytically by strong acids. Hydrochloric acid in extremely low concentrations, for example about 0.1% by weight or less, relative to the total solution, is preferably added. Usually, a lower saturated aliphatic alcohol, preferably methanol and ethanol, is used as the solubilizing agent for the hydrolysis reaction. For economic reasons, its concentration is kept low. The proportions by weight in the solution to be hydrolyzed are approximately between 5 and 20%, preferably 7.5 – 10%.

The hydrolysis of the silicic acid ester or of the organoalkoxysilane can be carried out directly in the aluminum salt solution. In this case, as a rule, addition of catalyst can be dispensed with. After bringing the components together, the reaction takes place, with stirring and gentle warming, within a few minutes, after which the mixture is stirred for a further ½ to 2 hours. The solution obtained in this way are waterclear and not opalescent. The silicic acid ester can, however, also be hydrolyzed separately and subsequently mixed, while stirring, with the aluminum carboxylate solution.

Small additions of $SiO_2$ already suffice to achieve good mechanical and heat stability of the aluminum oxide fibers. Though in principle high $SiO_2$ contents are not detrimental to the process of the present invention, they will generally not be used since the filaments then continuously assume the properties of $SiO_2$ fibres to an increasing extent as the $SiO_2$ content rises, and in particular the E-modulus approaches the value of $SiO_2$, of 7,000 kp/mm$^2$, which is very low in comparison to $Al_2O_3$. For this reason, the amounts of $SiO_2$ added are as a rule between about 1 and 20% relative to the total oxide sum, and preferably between about 7 and 15%.

Before manufacturing the actual spinning solution, yet further additives, with which the properties of the resulting fibers can be modified, can optionally be added to the conjoint dilute solution of the aluminum salt and the silane hydrolysis product. These additives serve to modify the fiber surface with regard to the use of the fibers as a reinforcing material, through the incorporation of basic, neutral or acid constituents, in such a way that depending on the matrix material used a firm bond between the matrix and fiber is formed in each case, which is of great importance for the strength of the composite material. It is furthermore possible, through incorporation of the additives, to give the fiber a surface character which resembles that of glass fibers, so that the adhesion promoters developed for the latter can also be used directly for the aluminum oxide fibers according to the invention. Desirably the additives should not adversely influence the strength of the fibers. Proportions of up to about 5% of MgO, preferably 0 to about 1%, and of up to about 10% of $P_2O_5$ and/or $B_2O_3$, preferably 0 to about 5%, relative to the total oxide sum, have already proved favorable. These components are usually added in the form of the oxides or of compounds which upon thermal decomposition form the oxides, with volatilization of the remaining constituents. Thus, for example, besides MgO basic magnesium carbonate is also very suitable; $P_2O_5$ is best used in the form of $H_3PO_4$ or as $(NH_4)_2HPO_4$ and $B_2O_3$, apart from being used as the oxide, may be added as $H_3BO_3$. It has been found that phosphate ions can only be added to concentrated solutions (>10% of $Al_2O_3$) since in more dilute solutions they lead to the precipitation of insoluble aluminum phosphate.

In the previously known processes for the manufacture of inorganic fibers, the salt solutions are concentrated, before spinning, to very high oxide concentrations in order to permit the drawing of fibers through increasing the viscosity. The viscosities necessary for this purpose are however generally so high that the solutions can then only still be filtered with great difficulty and have to be spun using high pressures.

In the process according to the invention, on the other hand, this disadvantage does not apply since the solutions, the oxide concentrations of which are generally between about 8 and 18%, preferably about 11 and 15%, are made spinnable by adding small amounts of polyethylene oxide, with the resulting viscosities only amounting to a few poise. The higher the degree of polymerization of the polyethylene oxide the lower is the amount required to obtain spinnable solutions. Degrees of polymerization of above about 2,000, especially above about 5,000, are preferred. The polyethylene oxide content is less than about 2%, relative to the spinning solution. At degrees of polymerization of 100,000 and above, additions of less than about 0.8%, down to about 0.1%, already suffice to give solutions of excellent spinnability.

The addition of the polyethylene oxide to the solution containing the fiber-forming elements can be effected, for example, by adding an appropriate amount of solid polyethylene oxide or a concentrated aqueous solution of polyethylene oxide while stirring and homogenizing the spinning solution thus produced by further moderate stirring for several hours. However, it is also possible to add the polyethylene oxide as a solution in warm methanol or a suspension in cold methanol and to produce a clear solution by slow stirring. If desired, the solution can subsequently be degassed in vacuo. After a final filtration, the solutions thus manufactured possess excellent spinnability.

Possible spinning processes are wet spinning and dry spinning processes. In the wet spinning process, the spinning solutions are spun into a suitable precipitation bath, where the sol-gel transformation occurs. The dry spinning process can be carried out, for example, in a centrifugal spinning machine, whereby staple fibers are obtained. However, a conventional dry spinning process is preferably used for the manufacture of continuous fibers. In this, the solutions are spun at room temperature or slightly elevated temperature from a spinning head provided with a plurality of nozzles. The filaments pass through a heated spinning column through which air or nitrogen flows in the same direction as the filaments travel. As a result of removal of solvent, the initially still liquid sol filament changes into a solid gel filament which can easily be handled. At the end of the spinning column the continuous filaments are wound up on a high speed drum. In this way, fiber diameters of between about 1 and 50 $\mu$, preferably between 6 and 15 $\mu$, are obtained. In general, the cross-sectional areas are of irregular shape.

Analytically, the glossy white gel filaments thus manufactured generally contain between 35 and 45% of oxide. The difference is attributable to the different degree of drying resulting from different column temperatures and different filament gauges. All constituents present in the spinning solution are still present in the gel filaments.

The filaments show no tendency to stick together and possess a strength which easily suffices for their further processing. This further processing consists of a heat treatment which aims at expelling all volatile constituents from the filament and sintering the remaining oxide components together to give a filament of high strength and high E-modulus. For this purpose, the continuous filaments are drawn continuously through a furnace having an appropriately designed temperature profile.

To manufacture staple fibers, the oxide fibers can subsequently be passed to a mechanical cutting device, where they are cut to the desired fiber length. It is however, also possible to cut the gel fibers before the heat treatment (in which case the shrinkage of the fibers during the heat treatment must be taken into account with regard to the final length) and either to feed them continuously, for example on grids or belts, through a tunnel furnace, or to heat them discontinuously to the desired final temperature, for example in a chamber-type furnace.

In the course of this treatment, alcohol and water first evaporate between about 70° and 150°C, and this is followed, from about 250°C onwards, by the pyrolytic decomposition of the organic constituents, which is largely complete at about 400°C. In the course of this decomposition, the fibers generally shrink to about 60% of their original length. The fibers are amorphous to X-rays up to high temperatures. As a result of the presence of $SiO_2$, the formation of $\gamma$-$Al_2O_3$, which otherwise takes place at about 500°C, is greatly retarded; the $\gamma$-phase only forms between 950° and 980°C in the form of extremely fine crystallites the size of which is generally about 40–70 A. The $SiO_2$ component at the same time remains amorphous and cannot be detected by X-rays. As the temperature rises further, the formation of mullite is observed to an increasing degree in the range from about 1,100° to 1,300°C; the higher the $SiO_2$ content of the filament, the lower is the temperature at which this reaction starts. Finally, the conversion of $\gamma$-into $\alpha Al_2O_3$ (corrundum) occurs. This transition is also displaced towards higher temperatures by the presence of $SiO_2$. While it takes place at between about 1,000° and 1,100°C in pure $Al_2O_3$, it is raised to above about 1,350°C at $SiO_2$ contents of, for example, 10%.

The $\gamma$-$Al_2O_3$ phase is accordingly stabilised by the presence of $SiO_2$.

On conversion to the corundum phase, the strength of the fibers generally declines greatly, which is proabably in part attributable to the very rapid growth of the crystallites to several hundred Anstrom units. Surprisingly, however, it proved possible through appropriately controlling the temperature, namely through brief rapid heating of $\gamma$-$Al_2O_3$ fibers to temperatures above the transition point, to obtain corundum fibers having good strengths and extraordinarily high E-moduli. Reaction times of about 5 seconds to 5 minutes at temperatures of between about 1,400° and 1,800°C have proved particularly suitable. Apart from being determined by their composition, the mechanical properties of the fibers are decisively determined by the nature of the heat treatment. High strength values and E-moduli values are obtained if the gel filaments are heated to the desired final temperature at a constant heating rate of between about 5° and 10°C per minute. Lower rates of heating can be used but they are less favorable for high yields. The best results are achieved if the temperatures rise is matched to the course of the decomposition of the fibers in such a way that the temperature rises more slowly in the regions where much gas is split off than in the regions in which no reaction takes place. Thus it is not possible to exceed about 20°C per minute in the region of evaporation of the alcohol and water (up to 150°C), and even about 10°C per minute during the pyrolysis stage (250°– 400°C), without noticeably damaging the filament structure. On the other hand, when the evolution of gas has ceased it is possible to heat at a substantially higher rate. Preferred heating rates are about 2° to 20°C/min. up to 250°C, about 0.5° to 10°C/min. at between 250° and 400°C and about 5° to 200°C/min. above 400°C.

The heat treatment can be carried out in various gas atmospheres with the gas appropriately being passed as a stream through the bundle of fibers, thereby carrying away the substances which have been split off. After completion of the pyrolytic decompostion, the speed of flow can be greatly reduced or a static atmosphere can be used. It was found that a treatment in air up to temperatures of about 1,100°C does not give carbon-free filaments. Only above this temperature does the residual carbon content originating from the organic constituents of the gel filament (carboxylate anion, alcohol and polyethylene oxide) burn away, this residual content amounting generally to between about 0.1 and 4%, preferably between about 0.5 and 2.8%, in the fibers according to the invention.

It is found, surprisingly, that burning away the carbon at temperatures above 1,100°C leads to a distinct reduction in the fiber strength. On the other hand, filaments which have only been heated in air to temperatures at which the carbon remains in the filament possess good mechanical properties. Accordingly, aluminum oxide fibers which are amorphous to X-rays and contain C, and polycrystalline $\gamma$-$Al_2O_3$ fibers which contain C, are producible by heat treatment in air, since temperatures below 1,100°C suffice for their manufacture.

For the manufacture of polycrystalline $\gamma$-$Al_2O_3$/mullite or $\alpha$-$Al_2O_3$/mullite fibers it is necessary to use higher temperatures. In order to avoid the carbon being burnt away at these temperatures, the treatment is carried out under an inert gas, preferably nitrogen. For economic reasons it is desirable to allow the first part of the heating to take place in air and only to carry out the treatment above about 1,100°C under an inert atmosphere. It is however also possible to displace the onset of the burning away of carbon towards higher temperatures by reducing the partial pressure of oxygen by mixing inert gas and air. In the case of the filaments obtained under inert gas again the carbon is burnt away by air or oxygen only above about 1,100°C. The fibers according to the invention are completely stable to oxidation below about 900°C, even on prolonged heating.

The cross-sections of the fibers are generally irregular in shape so that it appears more reasonable to state the average cross-sectional area rather than the average diameter. The cross-sectional areas can vary within wide limits depending on the predetermined spinning conditions. Typical values lie between about 30 and 180 $\mu^2$. The irregular shape of the fiber cross-sections makes the fibers according to the invention very particularly suitable for reinforcing purposes since they considerably improve the adhesion between the fiber and the matrix in comparison to the known reinforcing materials, which are mostly circular. This expresses itself in unusually high values for the interlaminar shear strength of unidirectionally reinforced composites.

The previous comments are illustrated below by a series of examples. The proportion of aluminum oxide and mullite indicated in individual cases was in each case calculated from the analytically determined amounts of $Al_2O_3$ and $SiO_2$, assuming a complete reaction of the silica present to give mullite. All percentages are, as also in the preceding text, percentages by weight. The mechanical properties were tested by means of the "Tecam micro-tensile testing machine", of Messrs, Techne, Ltd., Daxford, Cambridge, England.

Example 1

27 g of aluminum strip (99.99%) which has beforehand been amalgamated by dipping into 5% by weight $HgCl_2$ solution were dissolved at 40°C in a solution of 141 g of 98% strength formic acid in 800 g of water, while stirring and using reflux cooling. After completion of the solution process, which required about 5 hours, the solution was freed of the mercury formed by filtration and 4.9 g of a 20.4% strength silicic acid sol were added.

A stock solution of this silicic acid sol had been manufactured beforehand by hydrolysis of silicic acid tetraethyl ester by combining 200 g of silicic acid ester, 38 g of methanol, 0.4 ml of N HCl and 48 g of water in an open beaker, while stirring. After stirring for a further half hour, the $SiO_2$ sol was ready to use.

The combined aluminum formate-silicic acid solution was concentrated at 50°C and a pressure of 14 to 20 mmHg to give a clear concentrate having a total oxide content of 12.75% (12.5% of $Al_2O_3$ and 0.25% of $SiO_2$). On stirring in 0.9% (relative to the weight of the solution) of polyethylene oxide having a degree of polymerization of about 100,000, which was dispersed in a little cold methanol, a solution was obtained which after stirring slowly for 15 hours and subsequently filtering could be spun continuously. Its viscosity at 25°C was 270 cP at a shear stress of 19 $dyn/cm^2$.

Spinning was carried out by spinning the solution as a continuous filament from a reservoir, in which a slight excess pressure of 0.03 atmosphere gauge was maintained, at 25°C through a 20 mm long and 0.35 mm wide nozzle into a 3 m high and 7 cm wide column. This filament was dried by a stream of air pre-heated to 70°C and flowing in the same direction at the rate of 6 $m^3$/hour. The column temperature was maintained by external heating coils and was 60°C at the outlet.

The gel filament issuing from the spinning column was wound up on a rotating drum at a speed of 160m/min. The drum was located in a cabinet through which the issuing drying air flowed. The atmospheric humidity measured in the vicinity of the drum was throughout less than 35%.

The white, glossy filaments obtained in this way, which do not adhere to one another, were subsequently heated to 1,000°C in a stream of $N_2$ at 6° per minute and then cooled in the slowly cooling oven. Supple and strong filaments were obtained, which analytically consisted of 96.2% of $Al_2O_3$, 1.9% of $SiO_2$ and 1.8% of carbon. According to the X-ray diffractogram the aluminum oxide was present in the $\gamma$-form, with an average crystallite size of 65 A. At a filament cross-section of 62 $\mu^2$, 173 and 22,500 $kp/mm^2$ were determined as the average values for the tensile strength and the modulus of elasticity, respectively.

An attempt to convert these $\gamma$-$Al_2O_3$ filaments into corundum by annealing at 1,500°C in a stream of $N_2$ for 2 minutes gave very stiff fibers the carbon content of which, namely 1.5%, was practically unchanged. The crystallites had increased in size to 800 A during the transformation into $\alpha$-$Al_2O_3$.

EXAMPLE 2

An aluminum formate solution manufactured as in Example 1 was mixed with 12.9 g of a 20.8% strength $SiO_2$ sol, manufactured as in Example 1, and the mixture was concentrated to a concentration of 10.3% of $Al_2O_3$ and 0.54% of $SiO_2$. After adding 0.8% of polyethylene oxide, as indicated in Example 1, and stirring for two hours, this solution showed very good spinnability.

A part of the gel fibers obtained in accordance with the dry spinning process described in Example 1 was first heated in a stream of $N_2$ to 1,000°C at 6° per minute. After cooling the fibers, which were now black, were introduced under nitrogen into a furnace heated to 1,500°C, left there for 2 minutes and rapidly cooled by removing them from the hot zone. According to the X-ray powder diagram, this treatment resulted in he reaction of $Al_2O_2$ and $SiO_2$ to give mullite (crystallite size: 1,100 A) and in the conversion of the remaining aluminum oxide into corundum (crystallite size: 850 A). From the analytical data (94.5% of $Al_2O_3$, 5.0% of $SiO_2$ and 0.5% of C), the composition of the fibers is calculated to be 81.9% of corundum, 17.6% of mullite and 0.5% of C. The filaments at a cross-section of $59\mu^2$ had a tensile strength of 175 $kp/mm^2$ and an E-modulus of 30,000 $kp/mm^2$.

In a further experiment, the gel fibers were heated in a stream of $N_2$ to 1,500°C at 6° per minute. This yielded brittle fibers which easily disintegrated and which also consisted of $\alpha$-$Al_2O_3$ and mullite. The crystallite sizes, being 2,000 A and 1,800 A respectively, had however greatly increased relative to the fibers which were only briefly heated to 1,500°C.

EXAMPLE 3

An aluminum formate solution manufactured by dissolving 40.5 g of amalgamated aluminum (99.99%) in 141 g of 98% strength formic acid and 800 g of water was mixed with 40.9 g of a 20.8% strength $SiO_2$ sol manufactured as in Example 1 and the mixture was concentrated to a total oxide concentration of 12.6% (11.34% of $Al_2O_3$ and 1.26% of $SiO_2$). After adding 0.66% of polyethylene oxide as in Example 1 and stirring for two hours, the solution was spun analogously to Example 1 to give continuous filaments.

The gel filaments were heated in a stream of $N_2$ to 1,100°C at a heating rate of 6° per minute and were subsequently allowed to cool in the furnace. Black, glossy, very supple and strong filaments were thus obtained, which contained, as the sole crystalline phase, $\gamma$-$Al_2O_3$ with an average crystallite size of 70 A. The $SiO_2$ constituent was not detectable in the X-ray powder diagram. Analytically, the composition was found to be 88.1% of $Al_2O_3$, 9.8% of $SiO_2$ and 2.1% of carbon. The filaments, of 43 $\mu^2$ cross-sectional area, had an average tensile strength of 222 $kp/mm^2$ and an E-modulus of 20.500 $kp/mm^2$. Their density was found to be 3.0 $g/cm^3$.

EXAMPLE 4

A part of the gel fibers manufactured in Example 3 was subjected, both in a stream of air and in a stream of nitrogen, to a stepwise heat treatment matched to the course of the decomposition of the fibers. For this purpose, the temperature was raised at 10° per minute up to 250°C, at 3° per minute between 250° and 400°C and at 22°C per minute above 400°C up to 1,350°C. After reaching the final temperature, the filaments were removed from the hot zone and in this way rapidly cooled to room temperature.

After the treatment in the stream of $N_2$, black and very supple filaments resulted, which were very easy to handle. Analytically, the filament composition was found to be 87.9% of $Al_2O_3$, 9.7% of $SiO_2$ and 2.4% of C. The X-ray diffractogram showed, surprisingly, that the conversion to the corundum phase had not yet taken place. The greatly broadened reflections indicated the presence of $\delta$- and/or considerably disordered $\gamma$-$Al_2O_3$ in addition to a little mullite. The mechanical properties of the 30 $\mu^2$ cross-sectional area fibers were excellent, with average values of the tensile strength of 275 kp/mm$^2$ and of the E-modulus of 25,200 kp/mm$^2$.

The treatment in a stream of air gave carbon-free white, glossy filaments of which the X-ray diagram predominantly contained the lines of corundum (crystallite size: 710 A) and lines of mullite (705 A). However, the fibers only possessed moderate mechanical properties; they were brittle and very fragile.

If, on the other hand, the heat treatment in air was already broken off at 950°C, though in other respects the heating program remained the same, and the filaments were annealed for a further hour at this temperature and subsequently slowly cooled in the furnace as it cooled, burning away of the carbon could largely be avoided. The black, supple fibers thus obtained contained 88.8% of $\gamma$-$Al_2O_3$ having an average crystallite size of 65 A, 9.9% of $SiO_2$ amorphous to X-rays, and 1.3% of carbon. The average values of the tensile strength and of the E-modulus were 170 kp/mm$^2$ and 20,000 kp/mm$^2$ respectively.

In a further experiment, the same stepwise heat treatment of the gel filaments in air was already broken off at 900°C, after which the filaments slowly cooled in the furnace. In this way, filaments amorphous to X-rays were obtained, the analytical composition of which was unchanged compared to the filaments obtained at 950°C. The value of the average tensile strength, being 170 kp/mm$^2$, was also unchanged, but the E-modulus of 13,000 kp/mm$^2$ was distinctly lower.

EXAMPLE 5

50.6 g of aluminum (99.9%) were amalgamated by agitating for 15 minutes in a solution of 0.85 g of $HgCl_2$ in 1,050 g of $H_2O$ by stirring. After adding 176.25 g of 98% strength formic acid the metal was dissolved at 70°C while stirring and cooling under reflux. After cooling the solution, which was cloudy due to mercury particles, 141 g of methanol and 30.25 g of hexaethoxydisiloxane were added and the solution was then warmed to 60°C for one hour while stirring and subsequently filtered. the water-clear filtrate was concentrated at 50°C under a pressure of 14 to 20 mm Hg up to a concentration of 13.95% of $Al_2O_3$ and 1.55% of $SiO_2$. After adding 0.70% of polyethylene oxide, as indicated in Example 1, and stirring for two hours, the solution was spun in accordance with the dry spinning process described in Example 1.

The white, glossy gel fibers were subjected to the stepwise heat treatment indicated in Example 4, in a stream of $N_2$. In this treatment the temperature was raised to 1,100°C after which the filaments slowly cooled in the furnace while it cooled. The black, glossy filaments thus obtained consisted of 89.2% of $\gamma$-$Al_2O_3$ (crystallite size 60 A), 8.9% of $SiO_2$ which was amorphous to X-rays and 1.9% of carbon. At an average fiber cross-section of 62$\mu^2$, the tensile strength was 205 kp/mm$^2$ and the E-modulus was 22,000 kp/mm$^2$.

EXAMPLE 6

To a solution of basic aluminum formate, obtained as in Example 3, 42.7 g of a silicic acid sol with 20,2% by weight of $SiO_2$ manufactured in accordance with Example 1 were added. After concentrating the solution to a total oxide content of 14.4% (12.9% of $Al_2O_3$ and 1.5% of $SiO_2$), 1.53 g of 86.7% strength phosphoric acid were added together with sufficient water to give an oxide concentration of 13.5% (12.0% of $Al_2O_3$, 1.35% of $SiO_2$ and 0.15% or $P_2O_3$).

0.7% of polyethylene oxide having a degree of polymerization of about 100,000 was stirred into this solution as described in Example 1, and was homogeneously distributed by stirring for a further 2 hours. After a last filtration, the solution was continuously spun as in Example 1. The heat treatment of the gel filaments was carried out in a stream of nitrogen, at a heating rate of 6°C per minute, up to a final temperature of 1,100°C, after which the material cooled slowly, with the furnace switched off.

The resulting black, supple fibers consisted of 87.1% of $Al_2O_3$ in the $\gamma$-form (crystallite size: 70 A), 9.8% of $SiO_2$ amorphous to X-rays, 1.1% of $P_2O_5$ and 2.0% of carbon. At a filament cross-section of 42$\mu^2$, the filaments attained an average tensile strength of 234 kp/mm$^2$ and a E-modulus of 23,000 kp/mm$^2$.

EXAMPLE 7

44.6% of a silicic acid sol with 20,2% $SiO_2$ manufactured according to Example 1 and 4.78 g of boric acid ($H_3BO_3$) were successively added to a solution of basic aluminum formate, containing 76.5 g of $Al_2O_3$, manufactured as in Example 3, after which the mixture was concentrated to a total oxide concentration of 13.0% (11.3% of $Al_2O_3$, 1.3% of $SiO_2$ and 0.4% of $B_2O_3$). After adding 0.7% of polyethylene oxide, corresponding to Example 1, stirring for 3 hours and subsequently filtering, this solution could be spun as described in Example 1.

The heat treatment of the gel filaments consisted of continuous heating to 1,000°C in a stream of nitrogen at a heating rate of 6°C per minute, followed by 2 minutes' annealing at 1,500°C under nitrogen. The analysis and examinations by X-ray diffraction gave the following composition of the black, glossy fibers: 84.7% or $Al_2O_3$, 10.0 of $SiO_2$, 3.0% of $B_2O_3$ and 2.3% of C. Accordingly, the fibers consisted of 59.3% of corundum (crystallite size: 855 A), 35.4% of mullite (crystallite size 535 A), 3.0% of $B_2O_3$ and 2.3% of carbon. The tensile strength and E-modulus were 175 and 24,000 kp/mm$^2$ respectively. The filaments had an average cross-section of 63$\mu^2$.

Example 8

1.08 g of $MgCO_3.H_2O$ (39.3% of MgO), in the solid form, were first introduced into a solution according to Example 3, which contained 76.5 g of $Al_2O_3$ in the form of basic aluminum formate, and after this had dissolved 44.4 g of a 20.2% strength $SiO_2$ sol manufactured according to Example 1 were added. The solution was concentrated to a total oxide concentration of 12.6% (11.2% of $Al_2O_3$, 1.3% of $SiO_2$ and 0.1% of MgO) and after adding 0.7% of polyethylene oxide in accordance with Example 1, stirring for 2 hours and subsequent fine filtration, the solution was spun.

The gel filaments were first heated in a stream of nitrogen to 1,000°C at 6°C per minute and after slowly cooling were annealed for 2 minutes at 1,500°C, again under nitrogen. Black, matt-glossy fibers containing 86.7% of $Al_2O_3$, 10.2% of $SiO_2$, 0.5% of MgO and 2.6% of C were obtained, which accordingly consisted of 60.7% of corundum (crystallite size 815 A), 36.2% of mullite (crystallite size 900 A), 0.5% of MgO and 2.6% of carbon. The average cross-section of the filaments was 26 $\mu^2$ and the average values of their mechanical properties were 170 kp/mm² for the tensile strength and 22,000 kp/mm² for the E-modulus.

EXAMPLE 9

To manufacture fibers of a higher $SiO_2$ content, 36.75 g of silicic acid tetraethyl ester were hydrolyzed in an unfiltered solution of 50.6 g of aluminum (99.9%) in 1,050 g of $H_2O$, 176.25 g of 98% strength formic acid and 141 g of methanol, in accordance with the procedure described in Example 5. After filtration, the mixture was concentrated to a total oxide concentration of 13.1% (11.1% of $Al_2O_3$ and 2.0% of $SiO_2$) at 50°C and a pressure of about 20 mm Hg, and an easily spinnable solution was obtained by adding 0.7% of polyethylene oxide in accordance with Example 1.

The gel filaments obtained after continuous dry spinning were heated in a stream of nitrogen to 1,000°C at a heating rate of 6°C per minute and subsequently left to cool in the furnace. Thereafter, they contained 84.2% of $\gamma$-$Al_2O_3$ with a crystallite size of 60 A, 14.8% of $SiO_2$ amorphous to X-rays and 1.0% of carbon. The tensile strength and E-modulus were 220 and 23,000 kp/mm² respectively; the filament cross-section was 40$\mu^2$.

The $\gamma$-$Al_2O_3$ filaments thus obtained were subsequently subjected to the 2 minutes' high temperature treatment in a stream of nitrogen at 1,500°C which has already been described several times. In the course thereof, the $SiO_2$ reacted to give mullite (52.7%) and the remaining $Al_2O_3$ was transformed into corundum (46.7%). The crystallite sizes of the two fiber components were determined to be 1,000 A (mullite) and 700 A (corundum). The average tensile strength had declined to 170 kp/mm² after this treatment, while the formation of mullite and corundum caused a rise in the E-modulus to 27,000 kp/mm².

EXAMPLE 10

Fibers with an even higher proportion of $SiO_2$ and mullite were obtained by spinning a solution which has been obtained by adding had g of a 20.2% strength $SiO_2$ sol, manufactured according to Example 1, to a solution, obtained according to Example 3, of basic aluminum formate, subsequent concentration to a concentration of 13.5% total oxide (11.1% of $Al_2O_3$, 2.4% of $SiO_2$) and addition of 0.7% of polyethylene oxide in accordance with Example 1. After heating the gel filaments to 1,100°C at 6° per minute, very flexible and supple fibers resulted. According to the X-ray diffractogram the filaments predominantly consisted of mullite in addition to a smaller amount of $\gamma$-$Al_2O_3$. The phase distribution can be calculated from the analytically determined contents (80.8% of $Al_2O_3$, 17.1% of $SiO_2$ and 2.1% of C) to be 60.5% of mullite and 37.4% of $\gamma$-$Al_2O_3$. At a fiber cross-section of 21 $\mu^2$ the average tensile strength was 175 kp/mm² and the E-modulus was 20,500 kp/mm².

EXAMPLE 11

Unidirectionally reinforced composites were manufactured with epoxide resin, using the $\gamma$-$Al_2O_3$ fibers obtained according to Example 5. A hot-curing epoxide resin based on epichlorohydrin and bisphenol A (epoxide equivalent weight from 185 to 195) was used, with hexahydrophthalic anhydride as the curing agent and dimethylbenzylamine as the accelerator.

To manufacture the composites, the fibers impregnated with the liquid resin were introduced unidirectionally into rectangular steel molds which had beforehand been sprayed with polyfluoroethylene as the release agent. The excess resin was expelled at the open ends of the mold, in the direction of the fibers, by slowly lowering a ground male mold section, after which the mold was heated for one hour to 120°C to cure the resin. The resulting laminates, of size 220 × 6 × 4 mm, were subsequently subjected to a flexing test, with the ratio of span to thickness being 50. At a fiber content of 32% by volume the flexural strength of the laminate was found to be 56 kp/mm² and the E-modulus 7,200 kp/mm². The strength of the pure matrix material (13.5 kp/mm²) was accordingly more than quadrupled while the stiffness (280 kp/mm²) was increased approximately 26-fold. The determination of the block shear strength in the direction of the fiber axis gave 7.8 kp/mm², which led to the conclusion that there was a good bond between the fiber and the resin even without the use of adhesion promoters.

It will be appreciated that the instant specification and examples are set forth by way of illustration and not limitation, and that various modifications and changes may be made without departing from the spirit and scope of the present invention.

What is claimed is:

1. An aluminum oxide fiber of about the following percent composition by weight:

| | |
|---|---|
| $Al_2O_3$ | 61–98 |
| $SiO_2$ | 1–20 |
| $P_2O_5$ | 0–10 |
| $B_2O_3$ | 0–10 |
| MgO | 0–5 |
| C | 0.1–4 | the carbon being present in amorphous form.

2. An aluminum oxide fiber according to claim 1 which is amorphous to X-rays.

3. A polycrystalline aluminum oxide fiber according to claim 1 having a $\gamma$-$Al_2O_3$ X-ray diagram.

4. A polycrystalline aluminum oxide fiber according to claim 1, having an X-ray diagram which shows a mullite phase and at least one of the phases $\gamma$-$Al_2O_3$ and $\delta$-$Al_2O_3$.

5. A polycrystalline aluminum oxide fiber according to claim 1, having an X-ray diagram which shows the phases α-Al$_2$O$_3$ and mullite.

6. An aluminum oxide fiber according to claim 1, embedded as reinforcement in a plastic, metal, glass or ceramic matrix, the fiber having about the following percent composition by weight:

| | |
|---|---|
| Al$_2$O$_3$ | 76–96 |
| SiO$_2$ | 3–15 |
| P$_2$O$_5$ | 0–5 |
| B$_2$O$_3$ | 0–5 |
| MgO | 0–1 |
| C | 0.5–2.8 | the carbon being present in amorphous form and the fiber being irregular in cross-section.

* * * * *